United States Patent [19]

Williamson

[11] 4,319,068

[45] Mar. 9, 1982

[54] APPARATUS FOR SUPPORTING AND INSULATING AN ELECTRODE

[75] Inventor: Michael Williamson, Newark, Ohio

[73] Assignee: Owens-Corning Fiberglas Corporation, Toledo, Ohio

[21] Appl. No.: 154,689

[22] Filed: May 30, 1980

[51] Int. Cl.[3] .......................... C03B 5/02; H05B 3/06

[52] U.S. Cl. .............................................. 13/6; 13/25

[58] Field of Search ........................................ 13/6, 25

[56] References Cited

U.S. PATENT DOCUMENTS 3,391,236 7/1968 Blumenfeld .......................... 13/6 X 3,417,187 12/1968 Blumenfeld .............................. 13/6

*Primary Examiner*—Roy N. Envall, Jr.

*Attorney, Agent, or Firm*—Ronald C. Hudgens; Patrick P. Pacella; Paul T. Kashimba

[57] ABSTRACT

An apparatus for use with an electric furnace for supporting an electrode and insulating such electrode from an electrode jack associated therewith. The subject apparatus comprises a top support member which is adapted to support an electrode, a bottom support member which is adapted to be attached to an electrode jack, and insulation means disposed between the top and bottom support members. In a preferred embodiment the apparatus also includes means for holding the electric wires associated with the electrode.

15 Claims, 2 Drawing Figures

APPARATUS FOR SUPPORTING AND INSULATING AN ELECTRODE

BACKGROUND OF THE INVENTION

This invention relates to glass production and, more particularly, to an apparatus for use with an electric furnace for supporting an electrode and insulating such electrode from the electrode jack associated therewith. It is intended that the term "electric furnace," as used herein, denotes both electric melt and electric boost furnaces.

In electric furnaces for melting electrically semiconductive material, such as glass, it is important that the insulation around the electrodes be maintained in excellent condition. If the insulation fails, operating personnel may be subjected to a serious shock hazard. Moreover, such insulation failure may result in significant damage to equipment, thus resulting in a shutdown of the furnace. Poor insulation may be caused by either (a) breakdown of the existing insulation material due to cracks or chemical change caused by the local environment or (b) creepage on the insulating material, i.e., the flowing of electricity along the surface of the insulator. The creepage problem is intensified when dust and/or moisture collect on the insulator.

The electrode jack which is employed to support and align the electrode and to insert an additional portion of the electrode into the furnace as needed, is at ground potential. The electrode is attached to the electrode jack by an assembly which both supports the electrode and insulates it from the electrode jack. It has been found that the insulation of the prior art jack head assemblies fails when subjected to the harsh environment of a glass production furnace. Moreover, the prior art jack head assemblies cannot be easily cleaned and visually inspected, thereby intensifying the problem. In addition, if insulation breakdown was detected before an actual short circuit, the jack stand and the jack head assembly have to be lowered in order to replace the deteriorated insulation.

Therefore, it is an object of this invention to provide a reliable and safe jack head assembly that resists creepage and is easily cleaned, inspected and replaced.

SUMMARY OF THE INVENTION

In accordance with the present invention there is provided an apparatus for use with an electric furnace for supporting an electrode and insulating such electrode from the electrode jack associated with such electrode. The subject apparatus comprises: a top support member which is adapted to support an electrode; a bottom support member which is adapted to be attached to an electrode jack; and insulation means disposed between the top and bottom support members. In the preferred embodiment the present invention further comprises means for holding the electrical cables associated with the electrodes. Such holding means facilitates the attachment of a new piece of electrode because it holds the cables in position when the cable mounting brackets, which attach the cables to the electrode, are removed.

The jack head assembly of the present invention provides long surface creepage distances, some of which are underneath other surfaces, and in some embodiments all of which are underneath other surfaces, thereby helping to prevent the buildup of dust on the insulating portion of the jack head assembly. This arrangement offers less chance for the insulator to fail during operation, even if it is not cleaned regularly. Moreover, the open design of the present invention allows the assembly to be easily cleaned and visually inspected. If at least four insulating members are used, the present invention allows the removal of an insulating member which is suspected of being deteriorated, without lowering the jack stand and jack head assembly. Thus, the insulating member can be replaced while the jack head assembly is in position.

Other objectives, advantages and applications of the present invention will be made apparent by the following detailed description of the preferred embodiment of the invention.

DETAILED DESCRIPTION OF THE PREFERRED EMBODIMENT

Figure 1:
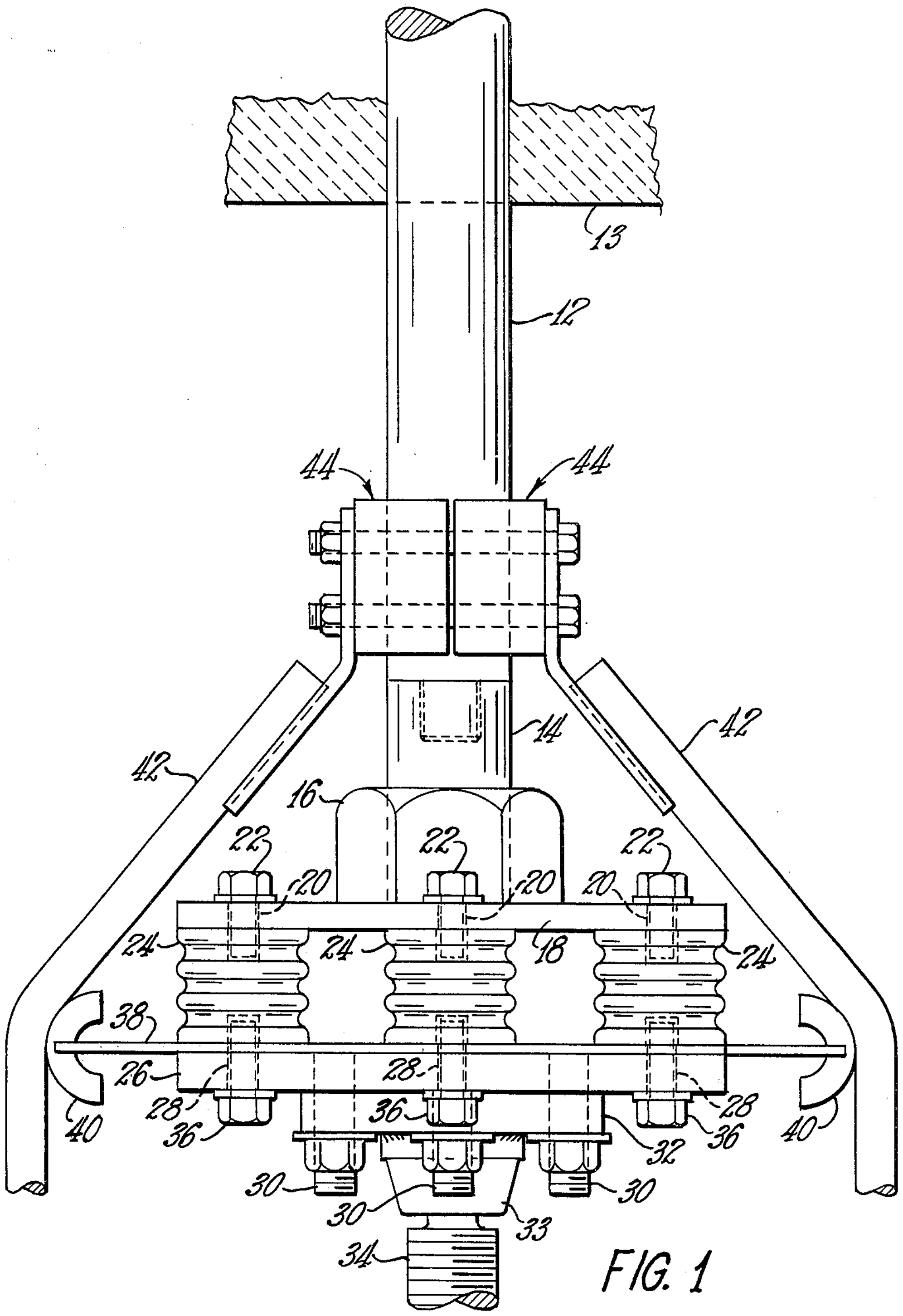
FIG. 1 is a side elevational view of the electrode jack head assembly of the present invention.

Referring to FIG. 1, a conventional electrode 12, which is inserted up through the bottom of an electric furnace 13, is connected to one end of electrode extension rod 14 by screw threads. The other end of rod 14 is connected by screw threads to nut 16 which is attached to plate 18 by welding or other suitable means of attachment. If desired, plate 18 may be formed such that it has a threaded aperture, thereby eliminating nut 16. In addition, rod 14 may be eliminated; in which case, electrode 12 would be screwed directly into nut 16. Still further, rod 14 could be attached, such as by welding, to either nut 16 or plate 18.

Plate 18 has a plurality of holes 20 which are suitably sized for the insertion of screws 22 therethrough. As shown in FIG. 1, plate 18 preferably has four holes 20 which are equally spaced radially and axially from the centerline of electrode 12; however, any number of insulators may be used and such insulator or insulators may be positioned in any suitable arrangement. It has been found that when at least four insulators are used one may be removed for testing or replacement with the other three providing reasonable stability and rigidity. Screws 22 are threaded into suitable threads in the steel or aluminum insert in insulators 24. Insulators 24 may be made of any suitable insulating material, such as glass polyester, or, for higher temperatures, glass silicon resin. Preferably, insulators 24 have fluted edges as shown in FIG. 1.

Plate 26 has a plurality of holes 28 which are positioned similarly to those of plate 18. Screws 36 are inserted through holes 28, through similarly placed holes in plate 38 and into the threaded steel or aluminum inserts contained in insulators 24. In addition, plate 26 has a plurality of threaded members 30 extending from the bottom thereof that are positioned equidistantly from the center of plate 26 and inwardly from holes 28. Members 30 are used to attach plate 26 to plate 32 of the jack stand. Generally, plate 32 is welded to a base 33 which has a socket to accommodate a ball on the end of support rod 34. A typical jack stand that is suitable for use with the present invention is manufactured by the Duff Norton Company. If desired, members 30 may be replaced by a plurality of screws inserted through suitable apertures in plates 26 and 38.

At least one dimension of plate 38 is larger than the corresponding dimensions of plates 18 and 26 so that plate 38 extends farther outward from the central axis of electrode 12 than plates 18 and 26. A cutout portion is provided on opposite sides of plate 38 so that a C-shaped insulating material such as a glass fiber reinforced epoxy, for example the insulating material manufactured by Westinghouse Electric Corp. under the trademark Micarta, may be inserted. Cables 42 are bent around the upper portion of C-shaped member 40 so that wires 42 may be attached to electrode 12 by brackets 44. Rod 14, nut 16, and plates 18 and 26 may be made of steel or any other suitable material. Plate 38 may be made of steel and be provided with insulating members 40, or plate 38 may be made entirely of an insulating material.

Figure 2:
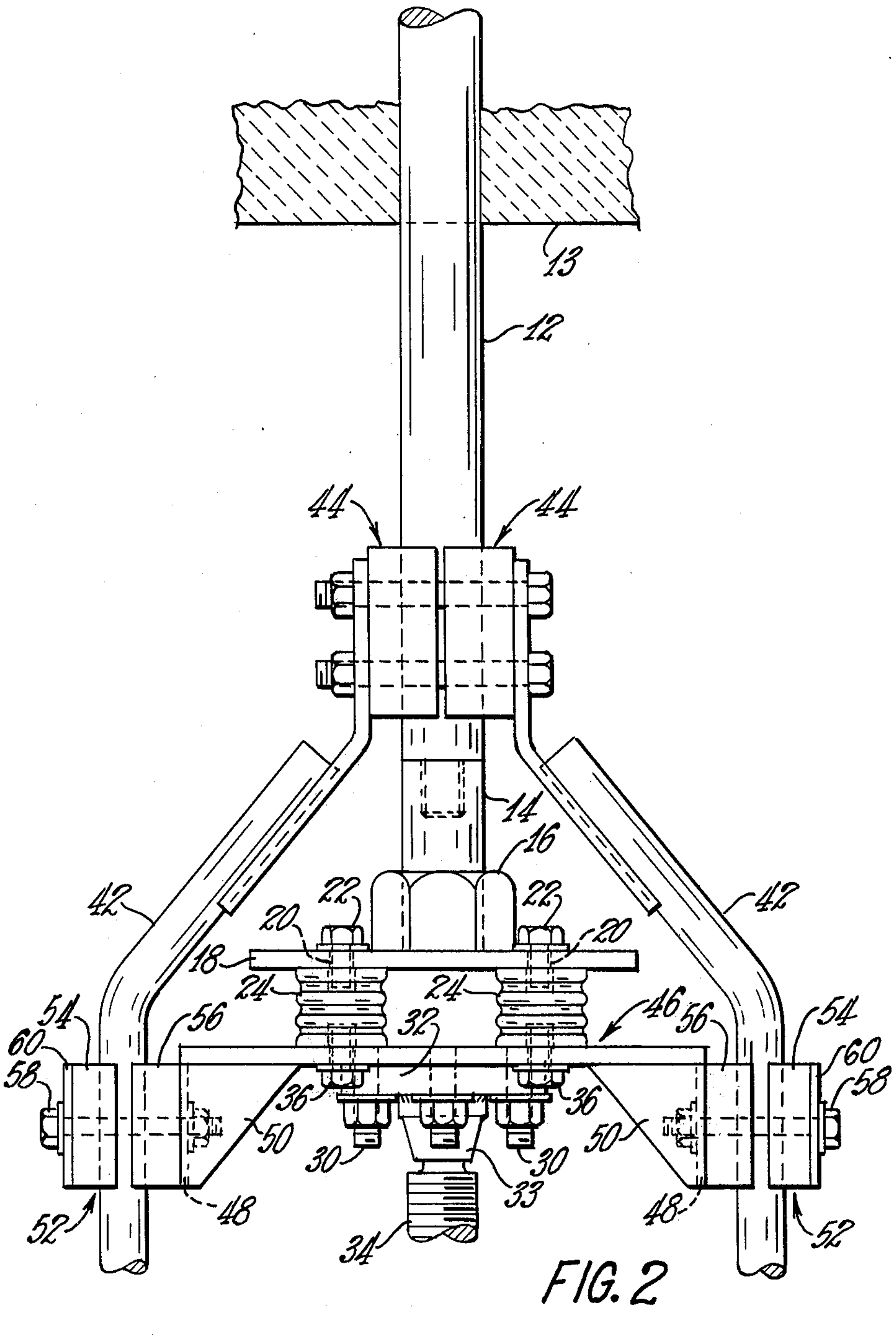
FIG. 2 is a side elevational view of the preferred embodiment of the electrode jack head assembly of the present invention.

The preferred embodiment of the present invention is shown in FIG. 2, wherein the elements, which have been shown in FIG. 1 and discussed in reference thereto, have been labeled with the same numerals. In this embodiment plate 38, together with C-shaped insulating members 40, and plate 26 have been replaced by member 46. Member 46 has a flat horizontal portion which is provided with holes 28 and threaded members 30 as described above in reference to plate 26. At least one dimension of member 46 is larger than the corresponding dimension of plate 18. In addition, member 46 has two vertical portions 48 and brackets or support means 50; a cable holder 52 is associated with each vertical portion 48.

Cable holder 52 has insulators 54 and 56 which are made of an insulating material, such as glass polyester, and have at least one aperture so that when insulators 54 and 56 are placed together the aperture of each forms a single aperture therethrough for holding cable 42. If desired, but not preferred, insulators 54 and 56 may be made of a non-insulating material. Preferably, the ends of the aperture are flared to lessen the possibility of damaging the insulation on the cable. Cable holder 52 may have a single aperture for accommodating one cable or a plurality of apertures for accommodating a plurality of cables. Insulators 54 and 56 of cable holder 52 are secured to vertical portion 48 by screws 58 which pass through apertures in plate 60, which is adjacent insulator 54, through similar apertures in insulators 54 and 56 and finally through similar apertures in vertical portion 48. Member 46, including vertical portion 48 and bracket 50, and plate 60, may be made of steel or any other suitable material.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. An apparatus for use with an electric furnace for supporting an electrode and insulating said electrode from an electrode jack associated therewith, said apparatus comprising:

(a) a top support member adapted to support an electrode;

(b) a bottom support member disposed below said top support member in parallel spaced relationship therewith and adapted to be attached to an electrode jack; and (c) a plurality of insulating members disposed between said top and bottom support members and being substantially equally spaced from the centerline of said electrode and substantially equally arcuately spaced from each other.

2. An apparatus as recited in claim 1, wherein said plurality comprises at least four insulating members.

3. An apparatus as recited in claim 2, wherein each of said insulating members has a plurality of flutes.

4. An apparatus as recited in claim 1, wherein said electrode has screw threads at one end thereof and said top support member has a threaded aperture which is adapted to mate with the threads of said electrode.

5. An apparatus as recited in claim 3, wherein said electrode has screw threads at one end thereof and said top support member has a threaded aperture which is adapted to mate with the threads of said electrode.

6. An apparatus as recited in claim 1, wherein said electrode has an electrical wire associated therewith and said apparatus further comprises means for positioning said electrical wire.

7. An apparatus as recited in claim 6, wherein said positioning means is electrically insulated from said wire.

8. An apparatus as recited in claim 1, wherein said electrode has an electrical wire associated therewith and said apparatus further comprises for holding said electrical wire.

9. An apparatus as recited in claim 8, wherein said holding means is insulated from said wire.

10. An apparatus as recited in claim 4, wherein said electrode has an electrical wire associated therewith and said apparatus further comprises means for positioning said electrical wire, said positioning means being insulated from said electrical wire.

11. An apparatus as recited in claim 4, wherein said electrode has an electrical wire associated therewith and said apparatus further comprises means for holding said electrical wire.

12. An apparatus as recited in claim 11, wherein said holding means is insulated from said electrical wire.

13. An apparatus for melting thermoplastic material, said apparatus comprising:

(a) a chamber adapted to hold said thermoplastic material;

(b) an electrode inserted into said chamber;

(c) an electrode jack means for moving said electrode; and (d) means for supporting said electrode and insulating said electrode from said electrode jack means, said supporting and insulating means comprising a top support member adapted to support said electrode, a bottom support member disposed below said top support member in parallel spaced relationship therewith and adapted to be attached to said jack means, and a plurality of insulating members disposed between said top and bottom support members and being substantially equally spaced from the centerline of said electrode and substantially equally arcuately spaced from each other.

14. An apparatus as recited in claim 13, wherein said electrode has an electrical wire associated therewith and said means for supporting and insulating said electrode further comprises means for holding said electrical wire.

15. For use with an electric furnace, an apparatus for supporting an elongated generally cylindrical electrode and electrically insulating it from an electrode jack, said apparatus comprising an upper support member adapted to support an elongated generally cylindrical electrode and having a generally planar portion extending transversely of an electrode when an electrode is being supported by the upper support member, a lower support member disposed below the upper support member, adapted to be attached to an electrode jack, and having a generally planar portion in spaced parallel relationship to the planar portion of the upper support member, and a plurality of generally cylindrical insulating members disposed in the space between the planar portions of the upper and lower support members, the axes of the insulating members being parallel to and transversely displaced from the axis of an electrode when an electrode is being supported by the upper support member.

* * * * *